United States Patent [19]

Nunlist

[11] Patent Number: 4,595,614

[45] Date of Patent: Jun. 17, 1986

[54] METHOD AND APPARATUS FOR APPLYING INTERNAL COATINGS TO VESSELS

[75] Inventor: Erwin J. Nunlist, Penfield, N.Y.

[73] Assignee: Kennecott Corporation, Cleveland, Ohio

[21] Appl. No.: 668,589

[22] Filed: Nov. 5, 1984

[51] Int. Cl.[4] .......................... C03C 27/02; F27B 9/14; B05C 3/02; B05D 7/22

[52] U.S. Cl. ......................................... 428/35; 118/55; 118/409; 427/231; 427/234; 432/124; 65/59.4

[58] Field of Search .................. 427/231, 234; 118/55, 118/409; 432/124; 428/35; 65/59.4

[56] References Cited

U.S. PATENT DOCUMENTS

| | | | |
|---|---|---|---|
| 1,498,515 | 6/1924 | Knopf | 118/64 X |
| 3,044,893 | 7/1962 | Heintz et al. | 427/183 |
| 3,230,105 | 1/1966 | Spraul et al. | 427/183 |
| 3,484,266 | 12/1969 | Nelson | 427/183 |
| 3,788,874 | 1/1974 | Crandall et al. | 427/193 X |

*Primary Examiner*—James R. Hoffman
*Attorney, Agent, or Firm*—R. Lawrence Sahr

[57] ABSTRACT

The problem of distortion in the shape of the vessel by simultaneous heating and rolling at high temperatures is remedied by adding shape retaining, firing rings to the vessel. Firing rings are rings spacedly attached to the periphery of the vessel to maintain the vessel out of direct contact with the rotating means while the vessel is heated to glass firing temperatures. Usually two rings are used, however, more than two may be utilized if desired. The rings extend a sufficient distance from the vessel side so that distortion of the vessel during glassing and rolling is prevented. Typically, the rings extend outward from the vessel wall a distance of from about 2 inches to about 18 inches and, more preferably, from about 4 inches to about 12 inches. The firing rings are loose fitted, or mounted, over the vessel exterior and preferably are positioned near or at the knuckle radius or radii of the vessel. A further advantage to the present invention rings is that the cylindrical vessel to be glass lined frequently has protrusions extending from the outside wall, for example, nozzles, access ports, pipe connection or sight glass locations. Such outward extensions would normally prevent rotation of the vessel, however, the use of the present firing rings selected to extend further outward from the vessel wall than such extensions, allow such vessels to be rotated and coated.

22 Claims, 5 Drawing Figures

METHOD AND APPARATUS FOR APPLYING INTERNAL COATINGS TO VESSELS

BACKGROUND AND PRIOR ART

The present invention relates to low porosity coatings, and more particularly, to a method and apparatus for applying an internal, low porosity, vitreous coating to tanks and process equipment.

Glass, or enamel internally coated tanks and process equipment have been in wide use for many years where smooth corrosion resistant internal surfaces are desired, or required. Such equipment is particularly adapted to use in the chemical, food, and beverage processing industries where it is widely used as reactors or tanks, as well as many types of storage, aging and mixing equipment.

The present method and apparatus utilizes the basic coating method described in U.S. Pat. No. 3,788,874 issued to Crandall et al. The method involves applying a low porosity glass coat to an article by maintaining the article at a temperature at least as high as the fusion point of the glass while depositing particles of glass on the article at a rate no greater than the rate at which the particles fuse to the article. While the prinicple and the method of the patent are sound, the method has not enjoyed widespread commercial use because of shortcomings in the technology needed to implement the method. The present invention seeks to remedy these shortcomings and provide for the commercialization of the Crandall et al method.

The teachings of the U.S. Pat. No. 3,788,874 Patent are incorporated herein by reference. The general method covered by the patent is useful in the application of both ground and cover coats. Some of the advantages accruing from the method include: low porosity coating, improved heat transfer, reduced number of heat cycles required to obtain continuous coating, and coatings of increased density may be obtained.

In accord with the present invention, cylindrical vessels are internally glass coated by placing the vessel in a furnace, heating and rotating the vessel as particulate glass is distributed and fused on the internal surface. The vessel is subsequently cooled to produce a vessel having an integral, internal glass lining.

Various means have been proposed to rotate articles within furnaces. For example, U.S. Pat. No. 1,498,515 describes a process of coating articles placed in a heated rotating drum; U.S. Pat. No. 3,044,893 describes a method of coating hot billets by rolling them in a supply of powdered glass; U.S. Pat. No. 3,230,105 teaches coating heated vessels with plastic or metal powder by rolling; and, U.S. Pat. No. 3,484,266 teaches glass coating of tubular items by rotating the items with a supply of powdered glass and subsequently firing. It will be noted that processes that involve high temperature coatings, typically, separate the heating and rolling steps. The reason for this is that at glass firing temperatures, (1500°-1700° F.), metallic substrates, typically iron or steel, are softened and are distorted by a rolling process carried out at glass firing temperatures.

BRIEF DESCRIPTION OF THE INVENTION

The problem of distortion in the shape of the vessel by simultaneous heating and rolling at high temperatures is remedied by adding shape retaining, firing rings to the vessel. Firing rings are rings spacedly attached to the periphery of the vessel to maintain the vessel out of direct contact with the rotating means while the vessel is heated to glass firing temperatures. Usually two rings are used, however, more than two may be utilized if desired. More than two rings may be needed in the case of extra-long vessels. The rings extend a sufficient distance from the vessel side so that distortion of the vessel during glassing and rolling is prevented. Typically, the rings extend outward from the vessel wall a distance of from about 2 inches to about 18 inches and, more preferably, from about 4 inches to about 12 inches. The firing rings are loose fitted, or mounted, over the vessel exterior and preferably are positioned near or at the knuckle radius or radii of the vessel. The loose fitting also allows the firing rings to expand and contract independent of the vessel. The knuckle radius of the vessel, also known as the transition knuckle is the area at which the spherical or elliptical end portion of the vessel joins the vessel side wall. Although the firing rings may be permanently attached to the vessel, it is preferred that they be detachably mounted to the vessel, suitably by tack welded tabs positioned on both sides of the firing rings. Thus, after the glassing operation the firing rings may be removed and subsequently reused. A further and important advantage to the use of firing rings is that the cylindrical vessel to be glass lined frequently has protrusions extending from the outside wall, for example, nozzles, access ports, pipe connection or sight glass locations. Such outward extensions would normally prevent rotation of the vessel, however, the use of the present firing rings selected to extend further outward from the vessel wall than such extensions, allow such vessels to be rotated and coated.

The present method facilitates the internal coating of a cylindrical vessel with a substantially continuous layer of a vitreous coating, such as glass. The method includes the steps of mounting firing rings on the exterior circumference of the vessel, placing the vessel in a furnace and heating while simultaneously rotating the vessel, distributing a particulate vitreous material about the heated interior of the vessel while maintaining a temperature in the vessel sufficiently high to fuse the particulate vitreous material as it is distributed. The external sides of the vessel are maintained out of direct contact with the rotational means by firing rings positioned in frictional contact with the rotational means. Typically, temperatures ranging from about 1500° to about 1850° F. are employed to fuse glass particles.

The present invention provides apparatus for carrying out the method. The apparatus is comprised of a furnace and a means of simultaneously heating and rotating a cylindrical vessel. The furnace comprises a furnace body adapted to receive a cylindrical vessel. The vessel has at least two firing rings spacedly mounted around the exterior thereof. The furnace has a plurality of rollers positioned in the lower portion. The rollers are adapted to rotate the vessel by frictional contact with the firing rings. The apparatus includes a retractable feed boom adapted to be inserted through the furnace wall and into the interior of the vessel to be coated. A supply of particulate vitreous material is fed through the boom and distributed through a distribution head into the interior of the heated vessel. A vitreous material, e.g. glass, is fed at a rate no greater than that at which the particles fuse to the interior of the vessel. Typically, a particulate glass feed having 90 percent of the particles between about 20 U.S. mesh and about 325 U.S. mesh is utilized with a preferred size range from about −60 to +200 U.S. mesh. The vitreous material may be varied to produce layers or coats having differing characteristics, for example, ground coats may consist primarily of metallic oxides, intermediate coats may consist of crystallized glass and cover layers may be of abrasion resistant material.

Due to the number of factors, such as internal surface area of the vessel, rotation speed, preheating of the particulate material through the boom, particle size and formulation, the rate at which the layer is deposited varies from application to application. However, deposition rates in the area covered of up to about 15 mils per minute are generally satisfactory. However, slightly slower rates, about 5 to about 10 mils per minute are preferred.

The rotation speed of the vessel can be varied over a wide range, but is directly related to the distribution and fusion rate of the particles.

DETAILED DESCRIPTION OF THE INVENTION

The invention will now be described by reference to the accompanying drawings wherein similar components are represented by similar numbers throughout the various views.

FIG. 4 illustrates an alternative embodiment wherein the furnace is equipped with insulated discs to facilitate the separate coating of a plurality of usually small outlets that may be located in the end of the vessel to be coated that might not otherwise be effectively coated from inside the vessel.

Figure 1:
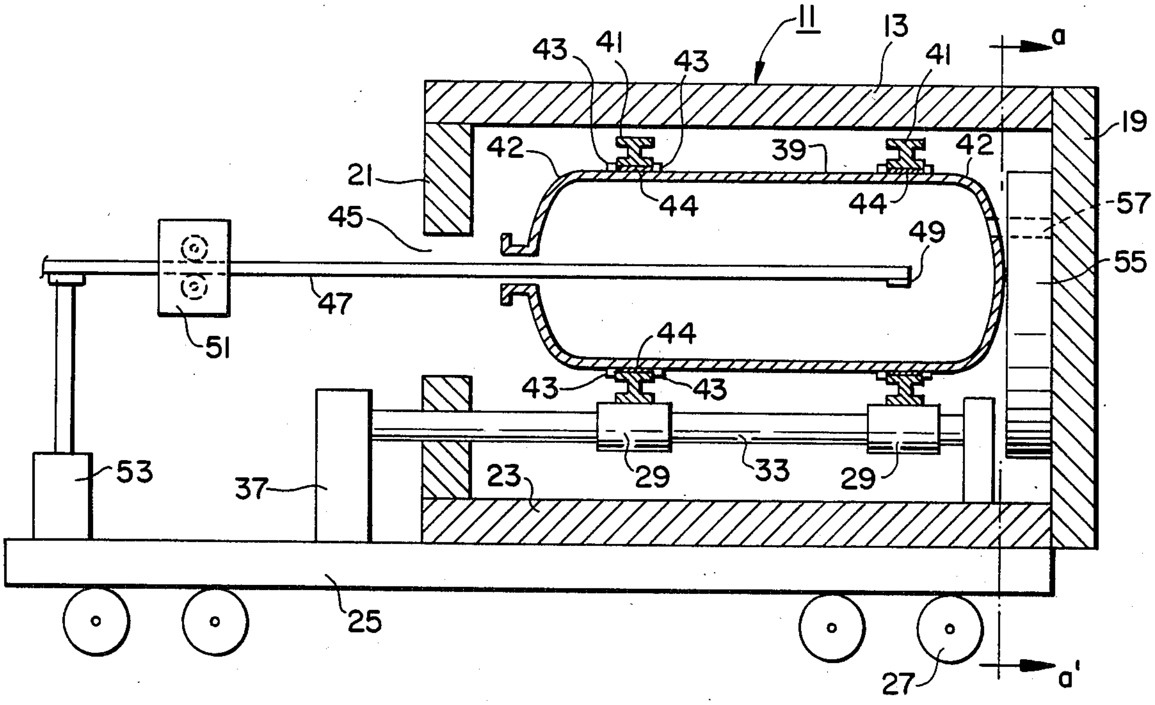
FIG. 1 is a front elevational view, partly in section, of the present furnace.

Looking now at FIG. 1 in detail, furnace 11 may suitably be constructed with stationary section comprised of top 13, sides 15, 17 and end 19. End 21 and bottom 23 may suitably be mounted on movable support platform 25. Platform 25 has wheels 27 preferably operated on rails, not shown, to facilitate movement of platform 25 into and out of contact with sides 15 and 17, top 13 and end 19. In this manner, the furnace is opened and closed. Platform 25 supports furnace bottom 23 which has spacedly mounted thereon two sets of roller sleeves 29 and 31 mounted on roller shafts 33 and 35, and are rotated by external drive 37. The roller shafts and sleeves are preferably fabricated of a high temperature resistant alloy. Furnace 11 is adapted to receive cylindrical vessels, such as 39. Vessel 39 has firing rings 41 attached thereto. Firing rings 41 suitably are loosely fitted over the outside circumference of the vessel contiguous to the knuckle radii 42, and are prevented from moving in a longitudinal direction by tack welded tabs, such as 43. Alternatively, rings may be tack welded directly to the vessel. In any case it is preferred that firing rings be removedly attached to the vessel rather than permanently attached. If desired, cushioning shims, 44, suitably of a low thermal mass insulation, such as, Fiberfrax ceramic fiber insulation, a product of The Carborundum Company, may be placed between the firing rings and the vessel sidewall. Furnace 11 is suitably heated by a means not shown. Heat sources such as electric or gas heating are eminently useful. End 21 has opening 45 therein adapted to receive retractable boom 47 which is shown extending through opening 45 and into vessel 39. A supply of particulate vitreous material, such as glass, is supplied through boom 47 and distributed internally in vessel 39 through distribution head 49. Boom 47 may be retracted by control 51 and may be raised or lowered within the vessel by moving the outer end up or down suitably by control 53.

Figure 3:
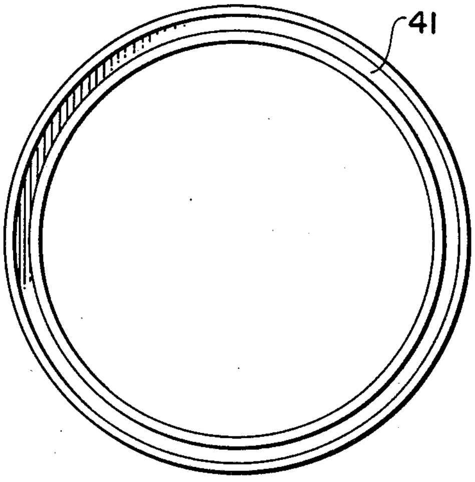
FIG. 3 is a side elevational view, partly in section, showing a firing ring.

FIG. 3 shows a firing ring as detached from the vessel to be lined. Ring 41 is suitably fabricated of iron or steel, more preferably, a high temperature resistant alloy is used. The ring is suitably formed of an "I" beam. The firing ring is preferably fabricated of a single loop or ring to facilitate smooth rotation. However, it may be fabricated of sections and bolted, or otherwise connected, to form a ring around the vessel to be coated.

Figure 4:
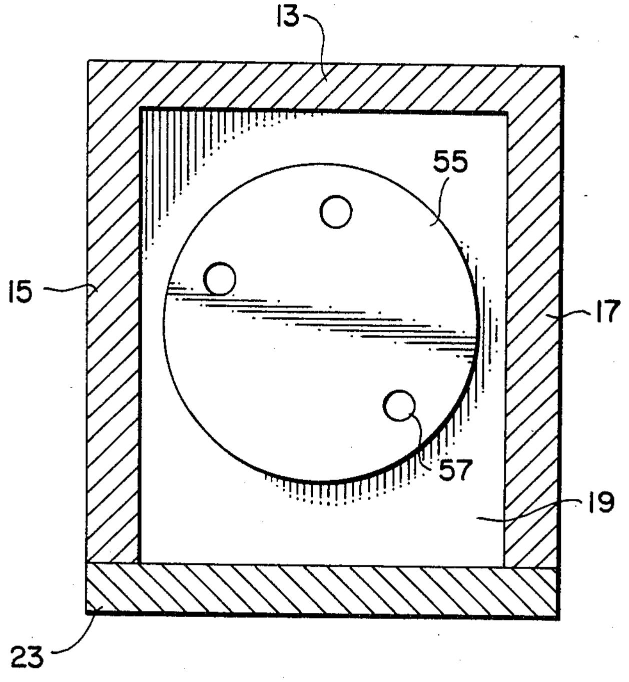
FIG. 4 is a sectional view taken along a—a' of FIG. 1.

FIG. 4 is a sectional view taken along a—a' of FIG. 1. This figure shows in detail an insulated disc 55. Disc 55 is circular and has openings 57 therein which are positioned to correspond and align with small outlets, ports or openings located in the end of the vessel to be coated. Disc 55 is adapted to rotate with the vessel in the furnace. Openings 57 allow access to corresponding openings in the vessel to be coated and a supply of vitreous material may be separately fed through openings 57 in rotating disc 55 to coat, or to insure coating, of vessel openings. Openings 57 may be closed and plugged when not in use.

Figure 2:
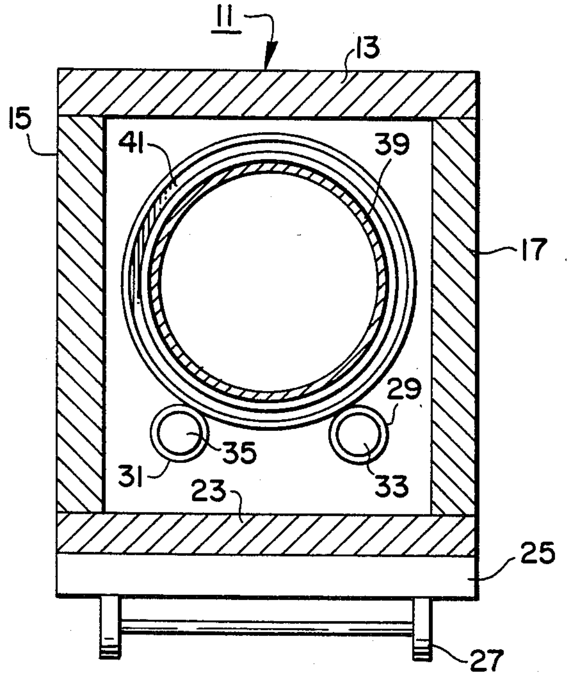
FIG. 2 is a side elevation, partly in section, of the furnace of FIG. 1.
Figure 5:
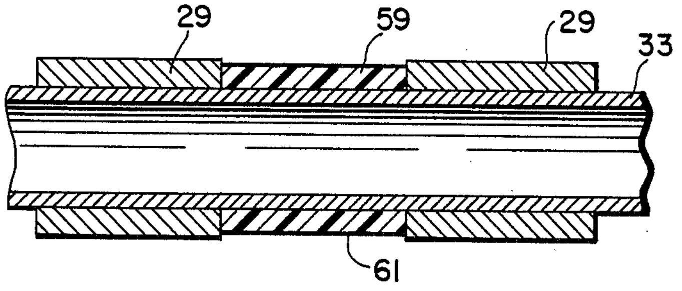
FIG. 5 is a side elevational view illustrating an alternative roller shaft structure for the furnace of FIG. 1. In this embodiment the roller shafts are heat insulated to limit the distortion which would otherwise be caused by the high temperatures encountered in the furnace.

FIG. 5 shows a sideview in detail of an alternative structure for roller shafts, e.g. 33 and 35, of FIG. 2. In this embodiment the roller shaft is insulated to minimize distortion, or warp, caused by high temperatures encountered within the furnace, such warping may subsequently cause uneven turning of the vessel being coated. Suitably, shafts 33 and 35 are hollow and cooling air or liquid is circulated therethrough. Roller sleeves, for example, 29, are preferably fabricated of an iron alloy resistant to high temperatures. The remaining portion of the roller shaft requires protection from the heat to prevent warp. This problem may be minimized by insulating the exposed roller shaft portions, for example, as shown in FIG. 5, with at least one layer of low thermal mass insulation 59, such as Fiberfrax® ceramic fiber insulation, a product of The Carborundum Company. The insulation may be further improved by utilizing an outside layer of reflective material, such as, particulate magnesium oxide 61. Insulation 59 may be attached to shaft 33 or may be stationary allowing sleeve 33 to rotate therethrough.

It will be understood that the present invention is not to be construed as limited to the foregoing specific examples, or embodiments, but may otherwise be practiced within the scope of the following claims.

What is claimed is:

1. A method of internally coating a substantially cylindrical vessel with a substantially continuous layer of a vitreous coating, whereby said vessel is simultaneously maintained in a substantially cylindrical shape, comprising the steps of:

(a) spacedly mounting at least two firing rings to the outside circumference of a cylindrical vessel;
(b) heating while simultaneously rotating said vessel;
(c) distributing a supply of particulate vitreous material within said vessel; while (d) maintaining the interior of said vessel at a temperature sufficiently high to fuse said vitreous material as it is being distributed; and (e) maintaining said vessel out of direct contact with the rotating means by use of said firing rings.

2. The method of claim 1 wherein each of said at least two firing rings is removably attached to said vessel.

3. The internally coated substantially cyclindrical vessel produced by the method of claim 2.

4. The method of claim 1 wherein each of said at least two firing rings is attached contiguous to the knuckle radius of said vessel.

5. The method of claim 1 wherein the temperature within the vessel is maintained between about 1500° and about 1850° F.

6. The method of claim 1 wherein the vitreous material is glass.

7. The internally coated substantially cyclindrical vessel produced by the method of claim 6.

8. The method of claim 1 wherein said coating is applied at a rate which would allow a thickness of between about 5 and about 10 mils per minute over the area covered.

9. The method of claim 1 wherein the particulate vitreous material is of a size between about 20 and about 325 U.S. mesh.

10. An internally coated substantially cyclindrical vessel produced by the method of claim 1.

11. A furnace system for simultaneously heating and rotating a cylindrical vessel comprising:

(a) at least two firing rings adapted to be spacedly mounted around the outside circumference ofa cylindrical vessel;

(b) a furnace body having a heating means therein, said furnace body adapted to receive said cylindrical vessel with said at least two firing rings spacedly mounted around said outside circumference of said cylindrical vessel;

(c) a plurality of rollers positioned in the button portion of said furnace body adapted to functionally contact said at least two firing rings; and (d) means to rotate said rollers, and in turn said at least to firing rings mounted around said outside circumference of said cylindrical vessel and said cylindrical vessel.

12. The furnace of claim 11 wherein one side of said furnace body has an opening therein to receive a retractable feed boom therethrough, said feed boom extendable into said vessel to supply and distribute particulate vitreous material within said vessel, and wherein said heating means is sufficient to raise and maintain the temperature within the furnace to the fusion point of said vitreous material.

13. The furnace of claim 12 wherein the vitreous material is glass.

14. The furnace of claim 11 wherein the firing rings are detachably secured to said vessel.

15. The furnace of claim 11 wherein the said firing rings are poitioned contiguous to the knuckle radius of said vessel.

16. The furnace of claim 11 wherein the said firing rings have an "I" cross-section.

17. The furnace of claim 11 wherein the said firing rings extend outward from the outside wall of said vessel a distance between about 2 and about 18 inches.

18. The furnace of claim 17 wherein the said firing rings extend a distance between about 4 and about 12 inches from the outside wall of said vessel.

19. The furnace of claim 11 wherein said rollers have hollow, rotatable shafts.

20. The furnace of claim 11 wherein said rollers have rotatable shafts, and said shafts are heat insulated by a layer of low thermal mass insulation.

21. The furnace of claim 20 wherein said insulation has a reflective outside layer.

22. The furnace of claim 11 wherein said furnace body has an end wall, said end wall having at least one circular disc portion, said disc portion adapted to rotate with said vessel, said disc portion having openings therein allowing access to corresponding openings in said vessel.

* * * * *